United States Patent [19]

Sato et al.

[11] 4,242,557
[45] Dec. 30, 1980

[54] APPARATUS FOR ELECTRICAL DISCHARGE MACHINING OF CYLINDRICAL WORK

[75] Inventors: Kunihiko Sato, Owari-Asahi; Tetsuro Urata, Nagoya; Mitsugi Kawano; Terumasa Jinba, both of Fukuyama; Yukio Kato, Kasugai; Takeo Uebayashi, Fukuyama, all of Japan

[73] Assignees: Mitsubishi Denki Kabushiki Kaisha; Nippon Kokan Kabushiki Kaisha, both of Tokyo, Japan

[21] Appl. No.: 946,405

[22] Filed: Sep. 27, 1978

[30] Foreign Application Priority Data

Sep. 30, 1977 [JP] Japan ................................ 52/116615

[51] Int. Cl.$^3$ ............................................. B23P 1/20
[52] U.S. Cl. ................................. 219/69 E; 219/69 M
[58] Field of Search .................. 219/69 E, 69 G, 69 M

[56] References Cited

U.S. PATENT DOCUMENTS

| 3,372,099 | 3/1968 | Clifford | 219/69 E |
| 3,800,117 | 3/1974 | Anderson | 219/69 E |

FOREIGN PATENT DOCUMENTS

385371 3/1965 Switzerland ..................... 219/69 E

Primary Examiner—C. C. Shaw
Attorney, Agent, or Firm—Fleit & Jacobson

[57] ABSTRACT

There is disclosed an apparatus for giving a satin finish to the surface of a crowned roll. A plurality of electrode heads are divided and arranged along the axis of rotation of the crowned roll to be worked, and one or a plurality of rectangular electrodes are mounted at a predetermined spacing on each of the electrode heads. The discharge gap of each rectangular electrode is controlled by a servomechanism at a predetermined value and it is also fed traversely a predetermined distance by a traverse feed mechanism. The electrode is rectractably mounted on the electrode head and it is fixed in position so that the discharge surface of the electrode is projected into contact with the roll surface of the crowned roll. The discharge electrode surface of each rectangular electrode is initially flat and this discharge surface is consumed to conform with the shape or contour of the roll surface upon initiation of discharge.

7 Claims, 14 Drawing Figures

CROWN: 0/100 mm

CROWN: $D_2-D_1/100$
$(D_2-D_1=1\sim30)$

CROWN $L_1$ 0/100 mm $-D_2-D_1/100$ mm
$\begin{pmatrix} L_1 = 100 \sim 800 \\ D_2 - D_1 = 1 \sim 30 \end{pmatrix}$ CROWN $L_1$ $(D_2\ D_1)$
$\begin{pmatrix} L_1 = 100 \sim 900 \\ D_2\ D_1 = 0.1 \sim 50 \end{pmatrix}$

APPARATUS FOR ELECTRICAL DISCHARGE MACHINING OF CYLINDRICAL WORK

BACKGROUND OF THE INVENTION

The present invention relates to apparatus for giving a satin finish to the roll surface of a work in roll form by electric discharge machining, and more particularly the invention relates to an electric discharge machining apparatus for giving a satin finish to the outer surface of a crowned roll with a predetermined surface roughness.

In the past, rolling mill rolls of many different shapes have been put in practical use to suit various thicknesses, widths and mechanical properties of rolled products, drafts, shapes of raw sheet materials, etc. they include a flat roll shown in FIG. 1, a sine-crowned roll in FIG. 2, a step-crowned roll in FIG. 3 and a narrow body crowned roll in FIG. 4, and these rolls are used alternately or each of the rolls is used several times continuously depending on the production schedule of a rolling mill. As a result, with a dull finishing machine which gives a satin finish to the surface of a roll, there occurs with high frequency the situation is high in which a plurality of rolls of different shapes are alternately machined and an electrode changing operation or electrode adjustment is required to suit the shape of a roll to be worked, thus deteriorating the working efficiency and thereby causing loss of time and requiring a large expense for labor.

In the past, various methods have been used to give a satin finish to the surface of crowned rolls by an electric discharge machine for rolls, and in accordance with the first method, as shown in FIG. 5, a preliminarily prepared electrode assembly 12 having the same shape as that of a roll 10 is used and the electrode assembly 12 is shaped by machining or the desired electrode shape is produced by using a dummy roll 10' as shown in FIGS. 6A and 6B. In any case, this method has the disadvantage of poor yield of electrodes since an electrode assembly of the same shape must be prepared to suit each one of different roll shapes and the electrode assembly must be changed to suit a roll of a different shape. Where a dummy roll is used to produce the desired electrode shape, there is a disadvantage in that not only a dummy roll is necessary for every roll but also the resulting crown tends to become somewhat smaller than the desired one since, as shown in FIG. 6B, the amount of change 14 in the roll shape of the dummy roll 10' cannot even theoretically become the same with the amount of change 16 in the electrode shape of the electrode 12 due to the difference in loss between roll 10' and the electrode 12. Another disadvantage of this method is that, since the electrode must be extended along the entire roll body length, the electrode must be in the form of multi-divided electrodes from the standpoint of ensuring a greater working efficiency, and as is well known in the art an insulator 18 must be provided between the electrodes as shown in the sectional view of FIG. 7 taken along the line VII—VII of FIG. 5, thus increasing the cost of working an electrode, decreasing the yield and requiring a complicated setting of the electrode assembly comprising an electrode holder 20, electrode mounting bolts 22 and a servomechanism 24. In addition, as is well known, discharge phenomenon can take place most efficiently at the electrode edge and, consequently, if a roll is machined without moving the electrodes having a sectional electrode shape as shown in FIG. 7, it is impossible to accomplish a uniform electric discharge machining of the entire roll surface and a streaky pattern in the roll surface is caused thus making the roll as such unfit for use as a rolling mill roll. To overcome this difficulty, during the machining of a roll the electrodes are each moved along the axis of the roll within the width of one electrode, this method is also disadvantageous in that moving the electrodes along the axis of the roll makes it impossible to maintain constant the gap between the electrodes and the roll along the entire width of the electrodes, and consequently a complicated mechanism is needed to move the electrodes from side to side along the roll shape instead of moving them along the roll axis. However, even if the electrodes are moved along the roll shape, due to the fact that the electrodes are arranged to oppose the entire range of the roll body length, on one side the electrode will be deviated from the roll surface, and consequently the deviated electrode will not be consumed, thus changing the electrode shape and eventually changing the shape of the roll at its ends as compared with the initial shape. It will thus be seen that the first method has many disadvantages, is difficult to be used in practical applications, and is not desirable from the standpoint of economy and quality of product.

In accordance with the second method, as shown in FIG. 8, a single electrode 12 which is not of a split structure is fed in the lengthwise direction of a roll 10 along the roll shape. The second method has the same disadvantages as the first method in that the method requires a longer working time, thus making it impossible to embody the method in an electric discharge machine capable of satinizing rolling mill rolls with a high productivity, and in that it is necessary to use electrodes which suit the shape of a roll. The second method is also of the type in which a different electrode material is used to make the electrode consumable, and this method is also disadvantageous in that the machining speed of a brass electrode is as low as about half of a copper electrode and the amount of electrode consumption is increased, thus increasing the frequency of electrode change. There are other disadvantages of the brass tending to deposit on the roll surface, a decrease in the number of indentations in the satin finished roll surface, and so on, and use of the second method in practical applications also involves a number of difficult problems.

SUMMARY OF THE INVENTION

The present invention overcomes the foregoing deficiencies of the prior art apparatus for giving a satin finish to the surface of crowned rolls by electric discharge machining.

It is therefore an object of the invention to provide an apparatus for giving, by electric discharge machining, a satin finish to the outer surface of crowned rolls with a predetermined surface roughness.

It is another object of the invention to provide an electric discharge machining apparatus which ensures a reduced working time by using rectangular electrodes mounted on a plurality of electrode heads which are divided and arranged.

It is still another object of the invention to provide an electric discharge machining apparatus which employs rectangular electrodes made of copper and consumable by electric discharge, whereby the electrode discharge surfaces which are initially flat are consumed by discharge to conform with the shape of the outer roll surface, thus eliminating the occurrence of working streaks.

It is still another object of the invention to provide an electric discharge machining apparatus in which the rectangular electrodes are retractably and adjustably mounted on the electrode heads so as to position the discharge surfaces of the rectangular electrodes along the outer surface of a roll.

It is still another object of the invention to provide an electric discharge machining apparatus in which a servomechanism is connected to the electrode heads so as to maintain the discharge gap between the rectangular electrodes and the roll outer surface at a predetermined value corresponding to the desired worked roll surface roughness.

It is still another object of the invention to provide an electric discharge machining apparatus comprising a head traverse feed mechanism by which the electrode heads which are arranged in divided relation are traversely fed a predetermined distance along the axis of rotation of the roll.

Other features and advantages of the invention will be apparent from the following description taken in conjunction with the accompanying drawings.

DESCRIPTION OF THE PREFERRED EMBODIMENTS

Figure 9:
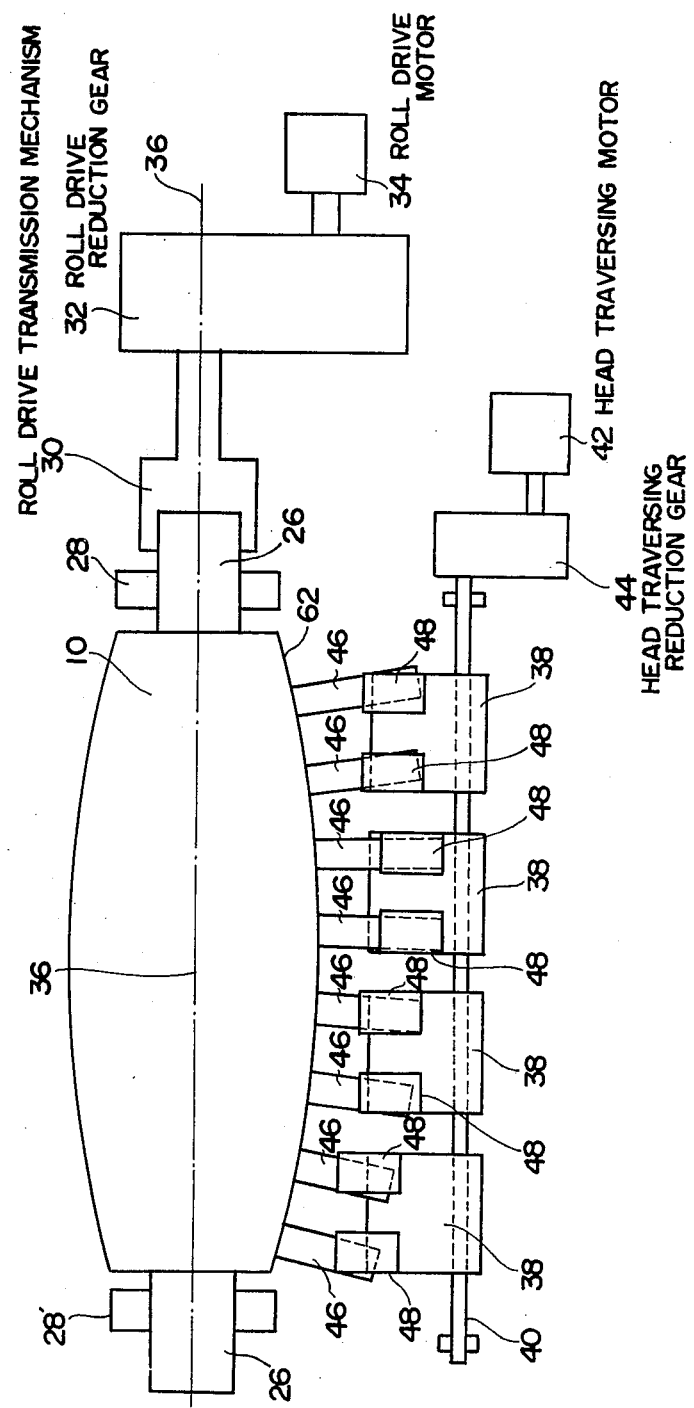
FIG. 9 is a planar schematic diagram showing an embodiment of an electric discharge machining apparatus according to the invention.

Referring now to FIG. 9, a crowned roll 10 which is to be given a satin finish by electric discharge machining, is rotatably mounted in roll supports 28 and 28' by means of shafts 26 and 26' at the roll ends. A roll drive motor 34 is connected to the roll support 28 through a roll drive transmission mechanism 30 and a roll drive reduction gear 32, and the crowned roll 10 is rotated at a predetermined constant speed.

On the other hand, a plurality of electrode heads 38 are divided and arranged along an axis of rotation 36 of the crowned roll 10. While the number of the electrode heads 38 in this embodiment is five, the invention is of course not limited to that number. To allow traversing of the electrode heads 38 along the axis 36, the electrode heads 38 are mounted on a head traversing shaft 40 disposed parallel to the axis 36, and the electrode heads 38 are fed traversely to the right or left by the rotation of the head traversing shaft 40 while maintaining the spacing between the electrode heads. The head traversing shaft 40 is rotated through a head traversing reduction gear 44 by operating a head traversing motor 42 at a constant speed.

A pair of electrodes 46 are mounted on each electrode head 38, and each electrode 46 is a rectangular electrode made of copper and having a planar electrode surface which is different from the shape of the roll 10. Of course, a single electrode 46 may be mounted on each electrode head 38 or, alternatively, the number of electrodes 46 may equal to or be greater than two. Each electrode 46 is mounted on the electrode head 38 by an electrode holder 48. The detailed construction of this electrode section will be seen from the two embodiments of the electrode mounting structure shown in FIGS. 10 and 11.

Figure 10:
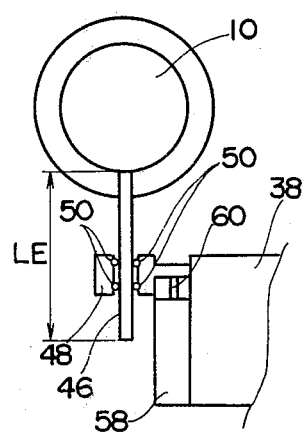
FIG. 10 is a side view showing an embodiment of a structure for mounting the electrode on the electrode head in the embodiment of FIG. 9.

Referring first to the embodiment shown in FIG. 10, the electrode 46 is mounted on the electrode holder 48 by inserting and holding it in position by electrode feed rollers 50, and in its initial position the electrode 46 is projected into contact with the crowned roll 10 by a servomechanism 58 (via actuator 60) connected to the electrode head 38.

Figure 11:
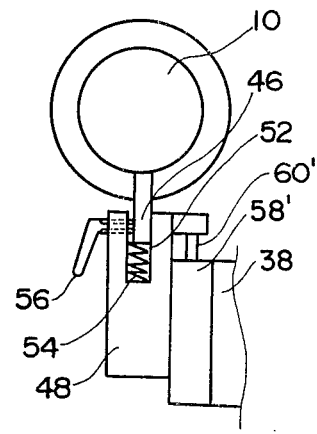
FIG. 11 is a side view showing another embodiment of the structure for mounting the electrode on the electrode head in the embodiment of FIG. 9.

With the other embodiment shown in FIG. 11, a spring 54 is mounted in a recessed portion 52 and the electrode 46 is fitted in the recessed portion 52. In this condition, the electrode 46 is fixed to the electrode holder 48 by an electrode fixing means 56 in such a manner that the electrode 46 is projected into contact with the crowned roll 10 under the force of the spring 54. The electrode holder 48 is controlled by an actuator 60' of a servomechanism 58' coupled to the electrode head 38 so as to maintain constant the gap between the electrode 46 and the crowned roll 10 during electric discharge machining.

Referring again to FIG. 9, the operation of the electric discharge machining apparatus of this invention will now be described. Firstly, the forward ends of the electrodes 46 are each pressed against the crowned roll 10 along its shape tangent line 62 by the feed roller mechanism 50 of FIG. 10 or the spring mechanism 54 of FIG. 11. Then, the electrodes 46 are locked in position on the electrode holders 48, the gap between the roll and the electrodes is filled with an insulating oil such as kerosene (not shown), the crowned roll 10 is rotated at a constant speed from the roll drive motor 34, and simultaneously the electrode heads 38 are fed traversely by rotating the head traversing shaft 40 at a constant speed from the head traversing motor 42 and the proper electrode gap corresponding to the desired worked roll surface roughness is provided by the servomechanisms 58 and 58' (FIGS. 10 and 11, respectively) coupled to the electrode heads 38, thus proceeding with the satinizing electric discharge machining. In this case, the required amount of traversing feed for each electrode 46 will be met by feeding the electrode within a distance over the electrode width up to the adjoining electrode.

Figure 12:
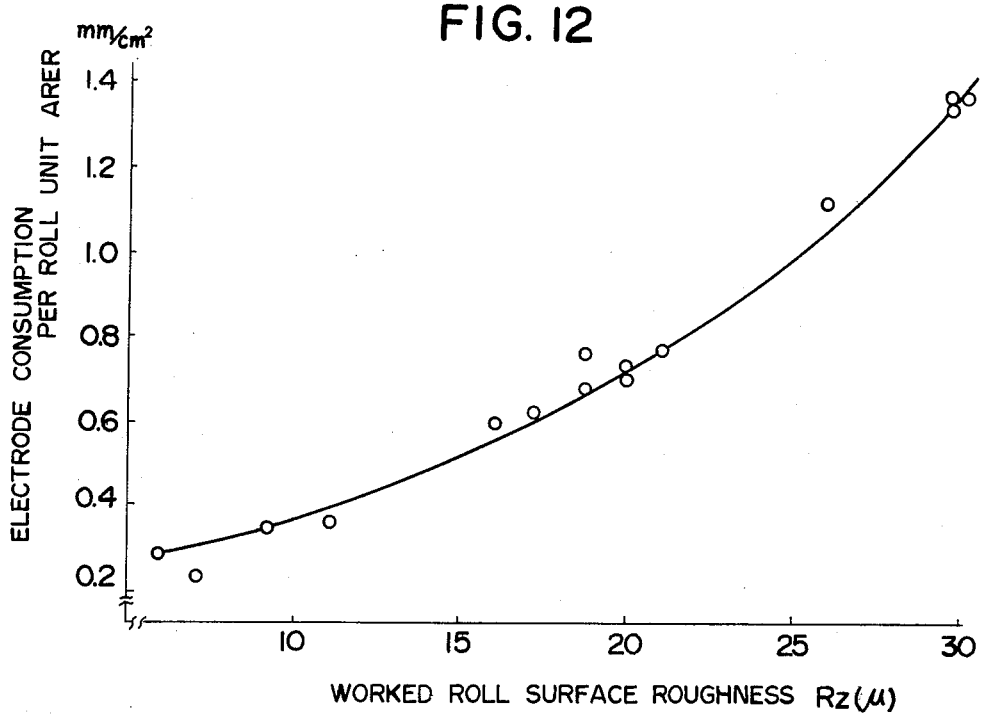
FIG. 12 is a graph showing the relationship between the roll surface roughness (Rz) and the amount of electrode consumption by the electric discharge machining apparatus according to the invention.

In this condition, before initiating the electric discharge machining, the electrode surfaces opposite to the roll have a rectangular plate form which is not in conformity with the shape of the roll 10. As a result, the magnitude of working current applied to the electrodes is selected so that the electrode weight consumption ratio falls in the range between 10% and 70% depending on the electrical conditions of the electric discharge machining conditions. These electrical conditions and the relationship between the worked roll surface roughness and the electrode consumption by weight are respectively shown by the following Table 1 and the graph of FIG. 12 in the form of the values obtained as the results of the practical uses.

TABLE 1

| | Electrode size: 1.0 mm (thickness) × 50.0mm (width) Electrode material: copper | | | |
|---|---|---|---|---|
| Electrode dimensions | Items $Rz\ (\mu)$ | Working current (A) | Pulse width ($\mu S$) | Off period ($\mu S$) |
| Working conditions | 30 | 50 | 130 | 4 |
| | 26 | 50 | 30 | 4 |
| | 19 | 32 | 8 | 4 |
| | 18 | 30 | 8 | 4 |
| | 16 | 28 | 8 | 4 |
| | 11 | 10 | 8 | 4 |
| | 9 | 8 | 8 | 4 |
| | 7 | 7 | 8 | 4 |
| | 6 | 2 | 8 | 4 |

In order to work a roll within the range that would not cause a streaky pattern when the roll is used in rolling a meterial, it has been found experimentally that there will be no problem if the change in the number of working revolutions at the speed of 3.4 rpm is less than 3 revolutions. Thus, even with the rectangular electrodes of the present invention having an outer peripheral shape which does not conform with the roll shape before initiating the machining, it is possible to give a uniform satin finish over the entire surface of the roll by electric discharge machining by taking into consideration the following three conditions, i.e., the electrode cross-sectional area and width, and the electrode weight consumption ratio.

Figure 13:
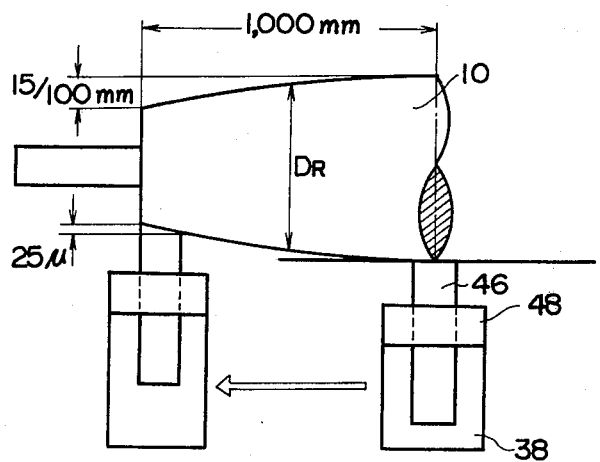
FIG. 13 is a schematic diagram useful for proving that a uniform satin finish can be given by using the rectangular electrodes of the invention.

This fact will now be explained with reference to a case in which a crowned roll 10 having a crown quantity of 30/100 mm is given a satin finish with a surface roughness Rz of 18μ by electric discharge machining under the conditions stated in the following subparagraphs (a) to (f), as shown in FIG. 13, showing the principles of the present invention:

| | |
|---|---|
| (a) Roll Length (L) | 2,000 mm |
| (b) Roll diameter (D) | 561 mmφ |
| (c) Number of roll revolutions (N) | 3.4 rpm |
| (d) Electrode head traversing feed speed (f) | 2.4 mm/min |
| (e) Electrode dimensions 50 mm width × 2 mm thick | |
| (f) Electrode consumption per unit area (a) | 0.7 mm³/cm² |

Assuming now that the electrodes 46 mounted on the electrode heads 38 by the electrode holders 48 have been moved from the center to the left end of the crowned roll 10, thus subjecting it to electric discharge machining, by the time that the electrode 46 is moved to the left end, the total number of roll revolutions (Nt) amounts to the following $$Nt = (L/2) \times (N/f) = 1,000 \times \frac{3.4}{2.4} \approx 1,416 \text{ rpm}$$

As a result, the change of crown shape ($\epsilon$) per roll revolution is given by:

$\epsilon$ = length of partial electrode consumption/$Nt$
   = 25μ/1,416 = 0.018 μ/rpm The length of electrode consumption (l) per roll revolution is given by:
l = (worked area × a)/(electrode cross-sectional area × Nt) = 87 μ/rpm Consequently, the electrode 46 conforms with the roll shape by the time that the crowned roll 10 rotates ($\epsilon$/l)×360°=0.074°, thus satisfying the required condition of less than 3 revolutions for preventing the occurrence of a streaky pattern, and thereby proving that no problem will be caused by the use of electrodes having a planar shape which does not conform with the roll shape.

Figure 1:
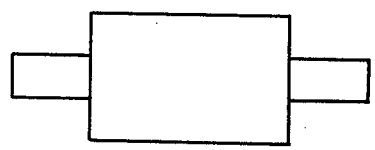
FIG. 1 is a schematic diagram of a flat roll for rolling mills.
Figure 2:
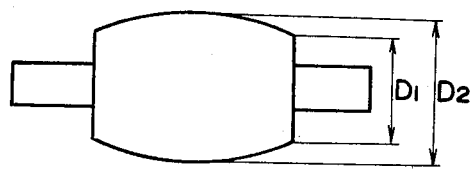
FIG. 2 is a schematic diagram of a sine-crowned roll which is to be given a satin finish by electric discharge machining in accordance with the invention.
Figure 3:
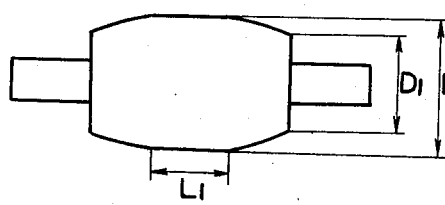
FIG. 3 is a schematic diagram of a step-crowned roll which is to be given a satin finish by electric discharge machining in accordance with the invention.
Figure 4:
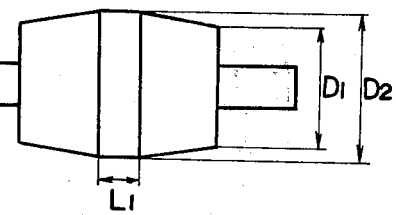
FIG. 4 is a narrow body-crowned roll which is to be given a satin finish by electric discharge machining in accordance with the invention.
Figure 5:
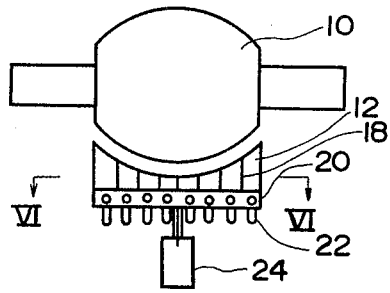
FIG. 5 is a schematic diagram showing the principal parts of a prior art apparatus for giving a satin finish to the surface of crowned rolls.
Figure 6A:
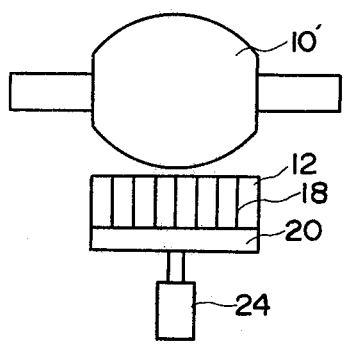
FIG. 6A is a schematic diagram for explaining the method of working the electrodes of the prior art apparatus with a dummy roll.
Figure 6B:
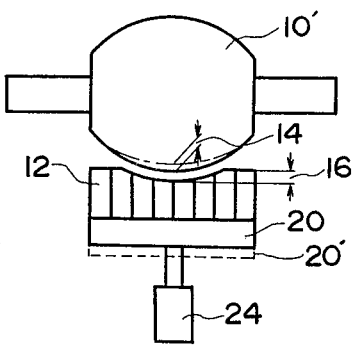
FIG. 6B is a schematic diagram showing the electrodes worked with the dummy roll.
Figure 7:
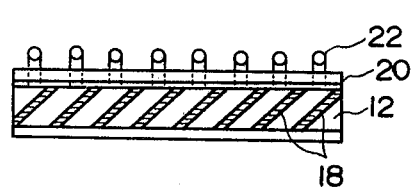
FIG. 7 is a sectional view of the electrodes in the prior art apparatus looked in the direction of the line VI—VI of FIG. 5.
Figure 8:
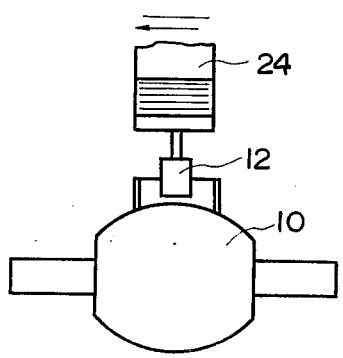
FIG. 8 is a schematic diagram showing the principal parts of another prior art apparatus.

While the above-described embodiment has been described as used in the electric discharge machining of the convex sine-crowned roll, the satinizing electric discharge machine of the invention can be used from the same standpoint for the electric discharge machining of all other types of crowned rolls including those shown in FIGS. 3 and 4.

It will thus be seen from the foregoing that, in accordance with the apparatus of the invention for electric discharge machining of works in roll form, there is no need to preliminarily shape and prepare the electrodes themselves to conform with rolls of different shapes; that is, the rectangular electrodes can be used as such with a resulting decrease in the cost of electrodes and the working steps, and moreover the fact that a plurality of the electrode heads are used and that a plurality of the electrodes are divided and arranged on each of the electrodes heads has the effects of simplifying the construction of the required electrode assembly and of requiring only a small amount of traversing feed for the electrodes, with a resulting great decrease in the working time, thereby decreasing the cost of equipment and labor and providing a practical apparatus for producing satinized rolling mill rolls for high production equipment.

It is obvious that the embodiments of the present invention described hereinabove are merely illustrative and that other modifications and adaptations thereof may be made without departing from the scope of the appended claims.

What is claimed is:

1. An apparatus for electric discharge machining of a work in roll form of a type wherein at least one electrode is moved along the axis of rotation of the rotating work and discharges are caused across a working gap defined by a gap between the electrode and an outer surface of the work in roll form to thereby give a satin finish of a desired worked roll surface roughness to the outer surface of the work, said apparatus comprising:

a plurality of electrode heads divided and arranged at predetermined spaces along the axis of rotation of the work in roll form;

at least one rectangular electrode retractably and adjustably mounted on each of said plurality of electrode heads, each said electrode having a flat discharge surface;

electrode gap adjusting means provided on each of said electrode heads for continuously biasing said at least one rectangular electrode against and into contact with said outer surface of said work in roll form in correspondence to said desired worked roll surface roughness; and electrode traversing means for traversely feeding each said electrode head a predetermined distance along the axis of rotation of said work;

wherein each said electrode head has a guide slot formed therein, said at least one rectangular electrode being received in said guide slot, said electrode gap adjusting means including spring means disposed in said guide slot for supporting said at least one rectangular electrode, and clamping means for securing said at least one rectangular electrode to said electrode head in such a position that said at least one rectangular electrode is biased by said spring means and projected against and into contact with said outer surface of said work by said spring means.

2. An appartus according to claim 1, wherein said work in roll form is a crowned roll.

3. An apparatus according to claim 1, wherein a plurality of rectangular electrodes is mounted on each said electrode head.

4. An apparatus according to claim 1, wherein each said at least one rectangular electrode is a copper electrode having an electrode weight consumption ratio in the range between 10 and 70% throughout electric discharge machining.

5. An apparatus according to claim 1, wherein said electrode gap adjusting means comprises a servomechanism.

6. An apparatus according to claim 1, wherein said electrode gap adjusting means includes a plurality of feed rollers for holding said at least one rectangular electrode therebetween so as to mount said at least one rectangular electrode on a corresponding one of said plurality of electrode heads.

7. An apparatus according to claim 1, wherein said at least one rectangular electrode is characterized by a mounting pitch and an electrode width, and said electrode traversing means comprises means for traversely feeding said at least one rectangular electrode along the axis of rotation of said work at least a distance corresponding to the mounting pitch of the adjoining at least one rectangular electrode beyond the electrode width.

* * * * *